US008818911B2

(12) United States Patent
Kaye et al.

(10) Patent No.: US 8,818,911 B2
(45) Date of Patent: Aug. 26, 2014

(54) PERMIT CREATION AND TRACKING IN A MAILING MACHINE

(75) Inventors: Steven M. Kaye, Weston, CT (US); Joan T. Doutney, Sandy Hook, CT (US); Rodney Hallgren, Norwalk, CT (US); Beth A. Kroczaleski, New Canaan, CT (US); Mark D. Lee, Oxford, CT (US); Jacky Y. Igval, Milford, CT (US)

(73) Assignee: Pitney Bowes Inc., Stamford, CT (US)

( * ) Notice: Subject to any disclaimer, the term of this patent is extended or adjusted under 35 U.S.C. 154(b) by 4980 days.

(21) Appl. No.: 10/639,380

(22) Filed: Aug. 12, 2003

(65) Prior Publication Data
US 2005/0038759 A1     Feb. 17, 2005

(51) Int. Cl.
  *G06Q 99/00* (2006.01)
  *G07B 17/00* (2006.01)
  *G06Q 20/20* (2012.01)
(52) U.S. Cl.
  CPC .......... *G06Q 20/20* (2013.01); *G07B 17/00435* (2013.01)
  USPC .............. 705/330; 705/62; 705/401; 705/408
(58) Field of Classification Search
  CPC ................................. G07B 17/00508
  USPC .......................................... 705/62, 401, 408
  See application file for complete search history.

(56) References Cited

U.S. PATENT DOCUMENTS

| | | | |
|---|---|---|---|
| 4,780,828 A | 10/1988 | Whisker | |
| 4,962,454 A | 10/1990 | Sansone et al. | |
| 5,801,944 A | 9/1998 | Kara | |
| 6,108,643 A * | 8/2000 | Sansone | 705/62 |
| 6,188,996 B1 | 2/2001 | Sansone | |
| 6,576,857 B1 * | 6/2003 | De Leo et al. | 209/584 |
| 2002/0165836 A1 * | 11/2002 | Fluckiger et al. | 705/401 |
| 2003/0074333 A1 * | 4/2003 | Foth et al. | 705/401 |

OTHER PUBLICATIONS

Replymailonline.com; Dec. 2, 2001; 14 pages.*

* cited by examiner

*Primary Examiner* — John Hayes
*Assistant Examiner* — Freda A Nelson
(74) *Attorney, Agent, or Firm* — Brian A. Lemm; Charles R. Malandra, Jr.; Steven J. Shapiro

(57) ABSTRACT

The present invention includes methods for operating a mailing machine. A permit mail imprint is generated in the mailing machine on the basis of input signals entered into the mailing machine via a user interface of the mailing machine. At least some of the input signals may represent alphanumeric characters. For example, the permit number may be entered via a keypad or keyboard in the form of numeric characters.

8 Claims, 6 Drawing Sheets

PERMIT CREATION AND TRACKING IN A MAILING MACHINE

BACKGROUND

This invention relates generally to the field of mailing machines, and more particularly to mailing machines that are utilized to process permit mail.

There are currently several methods of paying the postal service for collecting, sorting and distributing mail. For example, mailers may pay the post office for services provided by purchasing a stamp, i.e. a printed adhesive label, issued by the post office at specified prices, that is affixed to the mailpiece to show prepayment of postage. The placing of one or more stamps on a mailpiece can be labor intensive, however, especially for mailers having large volumes of mail.

Postage meters may also be used to pay for postage. A mailer may rent a postage meter from a private company that supplies postage meters, and may purchase postage from the post office that is loaded into the postage meter. As the postage meter is used to print meter stamps (also referred to as indicia) on mailpieces, corresponding amounts of postage funds are deducted from the amount stored in the postage meter.

Another method for paying for postal services is by permit mail. Permit mail is especially suited for mailers that have large volumes of mail. With permit mail, instead of using stamps or meter indicia, each mailpiece bears a permit imprint, sometimes also known as an indicia. The permit mail is brought to a postal induction site, referred to by the United States Postal Service (USPS) as a Bulk Mail Entry Unit (BMEU), by the mailer or an agent of the mailer. The mailer also prepares forms indicating the number of mailpieces in the mailing and the amount of postage estimated to be due. For manifest mail, a sampling of the mailing is performed at the induction site for comparison with the manifest provided by the mailer to determine the accuracy of the estimates made by the mailer. The postage due is calculated or verified by the postal authority and the mailer makes payment for the mailing, e.g., by check or by charging a deposit account maintained with the postal authority.

In some cases the permit imprint on the mailpieces is provided by preprinting the envelopes with the permit imprint. In other cases, mailing equipment such as a mailing machine prints the permit imprint on the mailpieces at the time a batch of mail is processed. In the latter case, data which represents the imprint image is stored in a memory of the mailing machine. According to known practices, the image data is composed by a supplier of the mailing machine on the basis of information supplied by the mailer. The image data is then loaded into the mailing machine by storing the image data in a memory card at the supplier's facility, sending the memory card to the location of the mailing machine, and interfacing the memory card to the mailing machine so that the mailing machine can read the image data from the memory card.

The technique for loading permit mail imprint image data into a mailing machine may involve considerable inconvenience for the mailer, as well as delay in equipping the mailing machine to commence permit mail operations after granting of a mailing permit by the postal authority.

SUMMARY

Accordingly, an improved mailing machine and an improved method for providing permit mail imprint image data to a mailing machine are provided. The improved method includes providing a mailing machine, and using a user interface to enter a plurality of input signals into the mailing machine, where each of the input signals represents a respective alphanumeric character. The improved method further includes, in response to the entry of the plurality of input signals, generating data which represents a permit mail imprint image. The generated data is stored in a memory of the mailing machine.

The image represented by the stored data may be printed by the mailing machine on a plurality of mailpieces. The mailing machine may generate a manifest that represents the mailpieces. The mailpieces and the manifest may be delivered to a postal authority for acceptance by the postal authority.

The same mailing machine may also be employed to print postage meter indicia on a second plurality of mailpieces.

The input signals entered may collectively represent one or more of a postal code such as a USPS zip code, a permit number, a city and/or state at which the mailpieces are to be delivered to a post office, and a name of a company that operates the mailing machine or that provides the mailpieces.

The entering of the input signals may include pressing keys of a keyboard or keypad and/or actuating regions on a touchscreen.

In other aspects, an improved mailing machine includes a transport mechanism for transporting mailpieces and a printer for printing information on the mailpieces. The improved mailing machine further includes a user interface for permitting a user to enter alphanumeric input signals into the mailing machine, where each of the alphanumeric input signals represents a respective alphanumeric character. The improved mailing machine further includes an image data generating mechanism that is responsive to the user interface and generates data which represents a permit mail imprint image, where the image indicates information that corresponds to alphanumeric data input via the user interface. The improved mailing machine also includes a storage device that is responsive to the image data generating mechanism and stores the data generated by the image data generating mechanism. Also included in the improved mailing machine is a control device that is coupled to the printer and to the storage device and causes the printer to print on the mailpieces the permit mail imprint image represented by the data generated by the image data generating means.

The mailing machine may also include a capability for generating a manifest that represents at least some of the mailpieces on which the printer prints the permit mail imprint image.

The mailing machine may include a postal security device coupled to the control device to hold postage funds. The postage security device may store a postal code such as a zip code and may provide the postal code to the image data generating mechanism, and the permit mail imprint image printed on the mailpieces includes the postal code.

The mailing machine may be operative to print postage meter indicia on mailpieces which it does not imprint with the permit mail imprint.

The mailing machine may have the capability of storing two or more different permit mail imprint images, and any one of the images may be selected for imprinting on the envelopes of a given mailing.

Therefore, it should now be apparent that the invention substantially achieves all the above aspects and advantages. Additional aspects and advantages of the invention will be set forth in the description that follows, and in part will be obvious from the description, or may be learned by practice of the invention. Various features and embodiments are further described in the following figures, description and claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION

The present invention includes apparatus and methods for generating permit mail imprint image data in a mailing machine on the basis of user input into the mailing machine. The user may be guided by templates and other software features to create an imprint image that is in compliance with postal requirements, such as, for example, the United States Postal Service (USPS). The user may be able to input the required data into the mailing machine immediately upon issuance of a mailing permit, so that there is no delay or inconvenience that might otherwise be required if it were necessary to request the imprint image from the mailing machine supplier.

Figure 1:
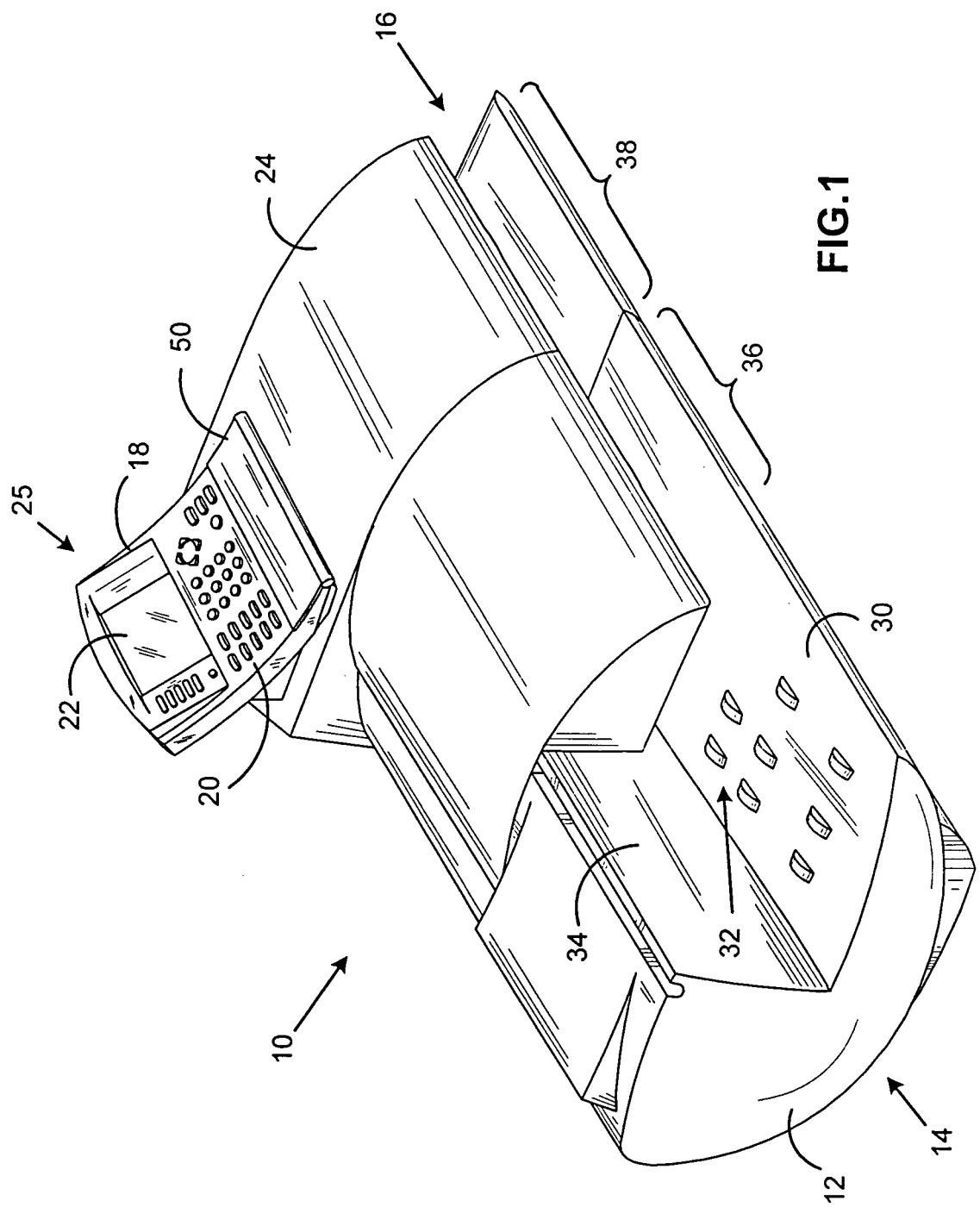
FIG. 1 is a perspective view of a typical mailing machine constructed and arranged in accordance with the principles of the present invention.

Referring now to the drawings, and particularly to FIG. 1, the reference numeral 10 indicates generally a typical mailing machine which incorporates the principles of the present invention. The mailing machine 10 includes a base unit generally designated by the reference numeral 12. The base unit 12 has an envelope infeed end, generally designated by the reference numeral 14 and an envelope outfeed end, designated generally by the reference numeral 16. A control unit 18 is mounted on the base unit 12, and includes one or more input/output devices, such as, for example, a keyboard 20 and a display device 22. Together, the input/output devices constitute at least a portion of a user interface 25.

Cover members 24, 26 are pivotally mounted on the base 12 and are moveable between a closed position shown in FIG. 1 and an open position (not shown). In the open position of the cover members 24, 26 various operating components and parts are exposed for service and/or repair as needed. A mailpiece transport mechanism which is not visible in FIG. 1 is housed under the cover members 24, 26.

The base unit 12 further includes a horizontal feed deck 30 which extends substantially from the infeed end 14 to the outfeed end 16. A plurality of nudger rollers 32 are suitably mounted under the feed deck 30 and project upwardly through openings in the feed deck so that the rollers 32 can exert a forward feeding force on a succession of mailpieces placed in the infeed end 14. A vertical wall 34 defines a mailpiece stacking location from which the mailpieces are fed by the nudger rollers 32 along the feed deck 30 and into the transport mechanism referred to above. The transport mechanism transports the mailpieces through one or more modules, such as, for example, a separator module and moistening/sealing module. Each of these modules is located generally in the area indicated by reference numeral 36. The mailpieces are then passed to a metering/printing module located generally in the area indicated by reference numeral 38.

Figure 2:
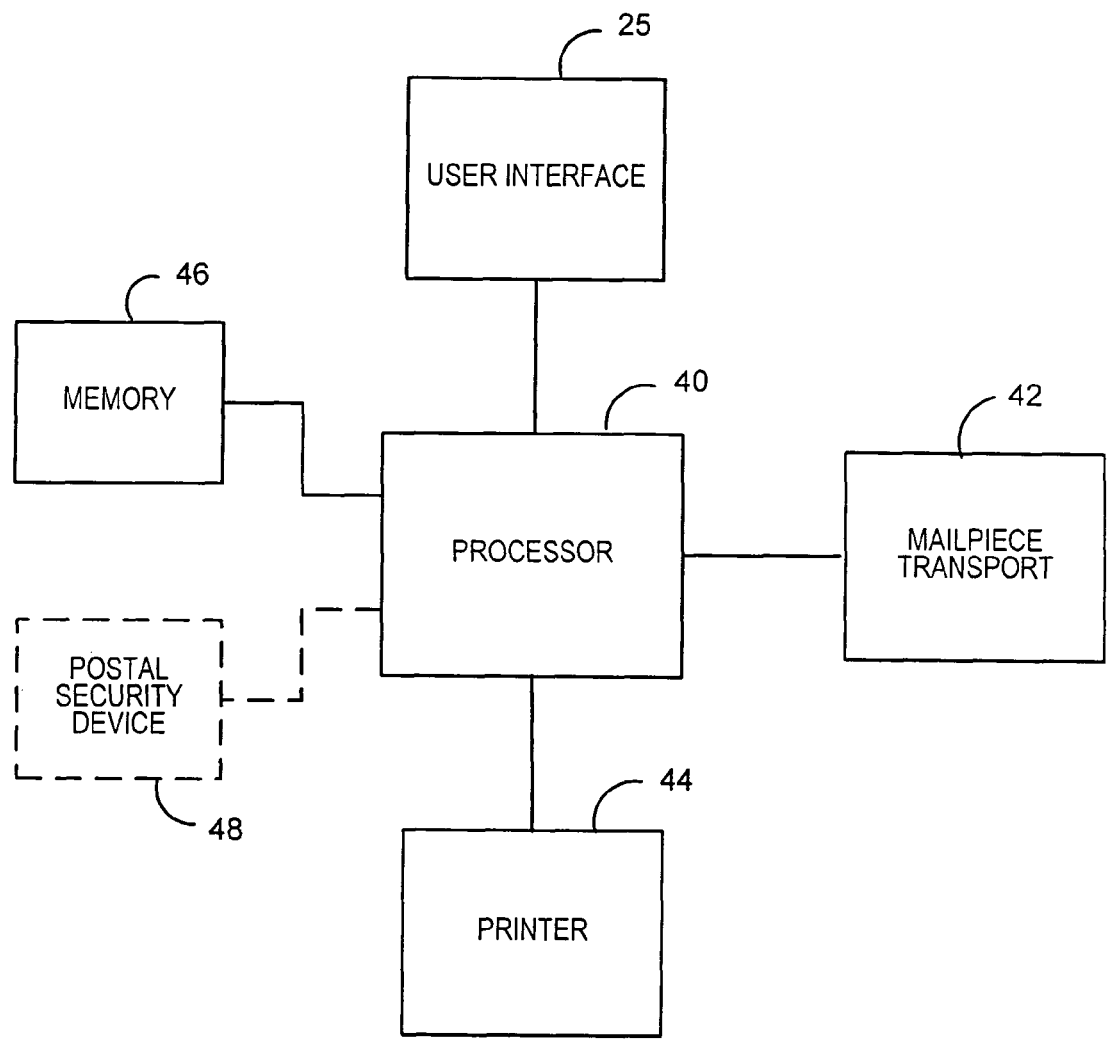
FIG. 2 is a block diagram representation of the mailing machine of FIG. 1.

FIG. 2 is a simplified functional block diagram representation of the mailing machine 10. The mailing machine 10 includes a CPU or processor 40 which generally controls (subject to operator input) all operations of the mailing machine 10. Although only a single processor 40 is indicated in FIG. 2, the control functions for the mailing machine 10 may, in some embodiments, be shared among two or more microprocessors and/or microcontrollers, which are not separately shown. The above-mentioned user interface 25 is coupled to the processor 40 to allow the operator to provide input to the processor 40 and to receive output from the processor 40. The above-mentioned mailpiece transport system is indicated by block 42 in FIG. 2 and is also coupled to the processor 40 so that the processor may control operation of the mailpiece transport system 42.

Also included in the mailing machine 10 is a printer module 44, by which the mailing machine 10 performs printing and/or meter stamping functions. The printer module 44 is coupled to the processor 40 so as to be controllable by the processor 40. In addition the mailing machine includes one or more memory components 46 that are coupled to the processor 40 and may provide program storage, working memory, configuration data storage and other memory and/or storage functions.

Also, if the mailing machine is to be capable of performing postage metering functions, it may include a postal security device (PSD) 48 (shown in phantom) which is coupled to the processor 40. In accordance with conventional practices, the PSD 48 may be a tamper-resistant, secure module which stores, accounts for, and dispenses postage funds. The PSD 48 may be part of the control unit 18 shown in FIG. 1.

In terms of hardware aspects, all of the components of the mailing machine 10 may be conventional. For example, the printer module 44 may be constituted by a conventional dot matrix printer such as an ink jet printer (not separately shown). The user interface 25 may include a numeric keypad plus an alphabetic or alphanumeric keyboard (visible in FIG. 1, with the keyboard located under cover 50). Also visible in FIG. 1 are soft keys by which the operator may navigate among menu items displayed on the display device 22.

Although not shown in the drawings, the mailing machine 10 may also include a data communication interface that is coupled to the processor 40 and allows the mailing machine 10 to engage in data communication with remote devices and/or data processing systems.

As noted above, the mailing machine 10 of the present invention facilitates entry of data to create permit mail imprints. For the purposes of the ensuing discussion it will be assumed that the entity which operates the mailing machine 10 has applied for a bulk mailing permit at a post office and that the permit has been granted. At this point, the mailing machine 10 may be operated in accordance with the process illustrated by the flow chart shown in FIG. 3 to accomplish creation of a permit imprint that corresponds to the permit granted by the post office.

Figure 3:
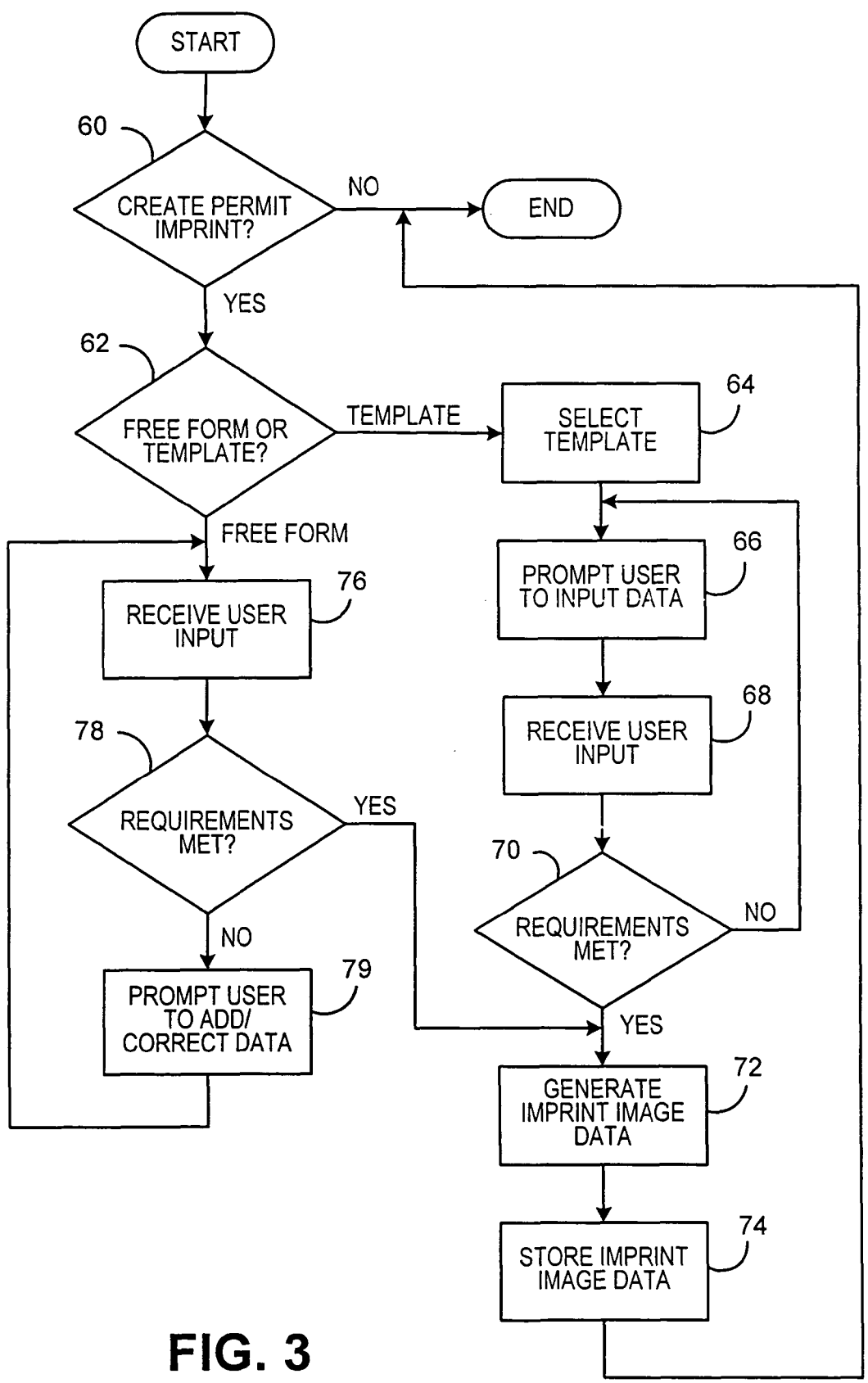
FIG. 3 is a flow chart that illustrates a process performed in the mailing machine of FIGS. 1 and 2 for generating permit mail imprint image data.

Initially in the process of FIG. 3, it is determined at step 60 whether the mailing machine is to be operated to create a permit mail imprint. This determination may be made based on operator input (e.g., by selection of a menu item via the user interface 25). If it is determined at step 60 that a permit mail imprint is to be created, then it may be determined at step 62 whether the permit mail imprint is to be created using a free form process or by use of an imprint template that has previously been stored (e.g., by the manufacturer) in the mailing machine 10. The determination made at step 62 may also be based on operator input by, e.g., selection of a menu item via the user interface 25.

If it is determined at step 62 that a template is to be used, then step 64 follows step 62. At step 64, the operator may be prompted to select a template from among a plurality of permit mail imprint templates that have been stored in the mailing machine 10. The operator may select a template by, e.g., selecting a menu item. In some embodiments the various templates available for selection may be displayed simultaneously or seriatim by the display device 22.

In other embodiments, only a single template may be stored in the mailing machine 10, in which case step 64 may be omitted. The stored template or templates may be such as to guide the operator to provide all information required to complete creation of a permit mail imprint and also may be such as to comply with postal authority requirements for the format of permit mail imprints.

Following step 64 (or directly following step 62 if step 64 is omitted) is a step 66, at which the mailing machine 10 prompts the operator via the user interface 25 to enter data required to complete the particular template selected by the operator at step 64. Then, at step 68, the mailing machine receives input from the operator in response to the prompt. (It will be understood that steps 66 and 68 may be iterated so that the operator inputs data and/or selection of alternatives or menu items in response to each of a sequence of prompts.) Among the information input by the operator, there may be a plurality of input signals that are entered via the user interface 25. At least some of the input signals may each represent an alphanumeric character. For example, the operator may input alphanumeric characters that represent one or more of: (a) a permit number, (b) a postal code (e.g., U.S. Postal Service zip code) of the post office to which mailings are to be submitted, (c) the name of the company or other entity which operates the mailing machine 10, (d) the name of the company or other entity which provides mailpieces to be processed for bulk mailing by the mailing machine 10 (in the case where the entity which operates the mailing machine does so in connection with processing mail for one or more other entities), and (e) the city and/or state or province from which the bulk mailings are to originate.

More generally, via steps 66 and 68, the operator may select and/or enter information corresponding to one or more of the following parameters for the permit mail imprint: (a) class of mail, (b) permit number, (c) city/state and/or postal code of origin, (d) non-profit status of mailer (if appropriate), (e) company/entity name of mailer (which may replace the permit number), and (f) date of mailing.

As used herein, "class of mail" should be understood to include not only broad classes of mail such as first class or third class, but also may include categories of mail for which various rate discounts are available, such as pre-sorted first class. The date of mailing parameter for the permit mail imprint may be omitted and/or the date of mailing may be printed separately from the permit mail imprint.

Following step 68 is step 70, at which the user input may be compared with one or more requirements for permit mail imprints to determine whether the user input complies with the requirements. For example, user input which corresponds to a zip code may be tested to determine whether such user input consists of five digits and/or matches a legitimate zip code. In addition or alternatively, as another example, user input which corresponds to a state abbreviation may be tested to determine whether such user input consists of two letters and/or matches one of the standard postal abbreviations for a state of the United States.

If a negative determination is made at step 70, then steps 66-70 may be iterated until the user input satisfies all requirements for permit mail imprints. Once a positive determination is made at step 70, then step 72 follows.

Figure 4:
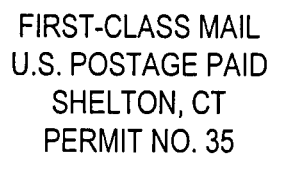
FIGS. 4 and 5 are examples of permit mail imprints that may be produced by the mailing machine of FIGS. 1 and 2.
Figure 5:
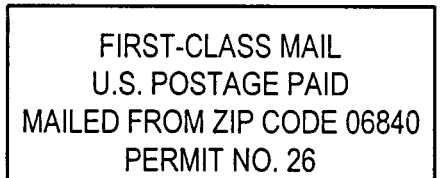

At step 72, the mailing machine 10 responds to the operator input by generating data which represents a permit mail imprint image that is in accordance with the template selected by the operator and the data input by the operator and/or the parameter selections made by the operator. FIGS. 4 and 5 are examples of permit mail imprint images such as may be generated by the mailing machine in response to the operator input. Those who are familiar with postal regulations will appreciate that the permit mail imprint image generated at step 70 may have other formats and other sets of information. For example, various permit mail imprint formats are set forth in Exhibit 4.1b for section P040 of the Domestic Mail Manual promulgated by the U.S. Postal Service.

Step 74 follows step 72. At step 74, the mailing machine stores the permit mail imprint image data generated at step 72 in the memory 46 (FIG. 2). For example, a component of the memory 46 in which the permit mail imprint image data is stored may be a non-volatile memory component.

Referring again to step 62 in FIG. 3, if it is determined therein that no template is to be employed in creating the permit mail imprint, then step 76 follows step 62. At step 76, the mailing machine receives input from the operator in a free form fashion to create the permit mail imprint. For example, a simple text editor may be employed to allow the operator to create several lines of text which (with a border that the mailing machine may automatically provide) may constitute the imprint. As in the case of step 68, the operator input received at step 76 may include plural input signals, each representing an alphanumeric character. The input provided by the operator may correspond to some or all of the imprint parameters described above. The input may also be provided through a data communication interface (not shown). For example, the operator could create a desired permit imprint utilizing a personal computer and input the created imprint into the mailing machine via a data port.

Following step 76 is step 78, at which the user input received at step 76 may be compared with one or more requirements for permit mail imprints to determine whether the user input complies with the requirements. This may be done, for example, in similar fashion to step 70. Alternatively, the free form text input at step 76 may be parsed to determine whether it satisfies one or more requirements such as permit number, zip code, city and state, etc.

If a negative determination is made at step 78, then step 79 follows. At step 79, the user may be prompted to add to and/or correct the free form text. Steps 76-79 may be iterated until the user input satisfies all requirements for permit mail imprints. Once a positive determination is made at step 78, then step 72 follows.

At step 72, which was described above, the mailing machine generates permit mail imprint image data in response to the operator input received at step 76. Also, as before, step 74 follows, at which the permit mail imprint image data is stored in memory.

In some embodiments, the mailing machine may support only one of free form creation of a permit mail imprint and use of a template to create a permit mail imprint. In other embodiments, the mailing machine may guide the operator in a question and answer format to enter information required to create the permit mail imprint.

In some embodiments, the mailing machine may be arranged (i.e., the processor 40 may be programmed) to generate and store more than one permit mail imprint image. The entity which operates the mailing machine may have one or more of a number of different reasons for wishing to utilize more than one permit. For example, it may be desired to use the mailing machine to prepare respective mailings in more than one class of mail. Or, the entity that operates the mailing machine may be a mailing house that prepares mailings for a number of different customers, each having their own permit or permits. In some other cases, it may be desired to submit (induct) mailings into more than one post office. For example drop shipment of at least some mailings to remote post offices may be employed to obtain better service or to obtain rate concessions.

In any event, if the mailing machine is to be used to print more than one permit mail imprint, the process of FIG. 3 may be performed more than once, with a different permit mail imprint image generated each time the process is performed. The result is that plural permit mail imprint images (or, more specifically, respective data representing the images) are stored in the memory of the mailing machine. The permit imprints may differ from each other in terms of one or more of class of mail (also referred to as "mail class"), permit number, postal code, city/state of origin, and company name.

Figure 6:
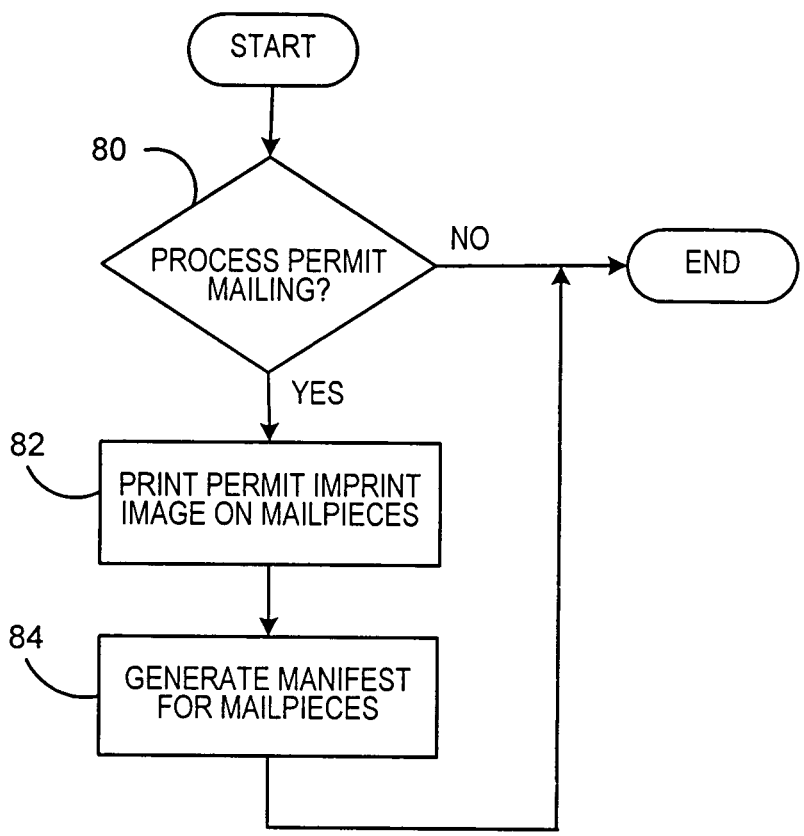
FIG. 6 is a flow chart that illustrates a process performed in the mailing machine of FIGS. 1 and 2 for producing a permit mailing.

FIG. 6 is a flow chart that illustrates a process performed in the mailing machine 10 for producing a permit mailing. Initially at step 80, it is determined whether a permit mailing is to be processed. This determination may be made based on operator input. If a permit mailing is to be processed, then step 82 follows. At step 82, a sequence of mailpieces is fed through the mailing machine 10, with the mailpiece transport mechanism 42 (FIG. 2) feeding the mailpieces to and past the printer module 44, and the printer module 44 printing on the mailpieces a permit mail imprint image that has previously been generated by and stored in the mailing machine 10 by performing the process that was described above in connection with FIG. 3.

Following (or overlapping with) step 82, is a step 84, at which the mailing machine 10 generates a manifest for the mailing in accordance with conventional practices. The manifest may then be printed (by the mailing machine 10 or a report printer (not shown) that may be coupled to the processor 40) or may be sent by data communication to the post office at which the mailing is to be inducted. The manifest could include information such as, for example, the class of mail, the postage value, the discount level, the number of pieces of mail in the batch, the date/time of processing, the weight of each mailpiece, total weight of the batch, customized discount codes, destination information for each mailpiece, and the date/time of anticipated induction or requested pickup. Portions of the information included in the manifest can be input by the operator based on prompts from the mailing machine, or can be automatically added by the mailing machine 10 if already known by the mailing machine 10. In any case the mailpieces which constitute the mailing and the manifest therefor are presented to the post office, and induction of the mailing and payment therefor may proceed in a conventional manner. The generation and printing of the manifest may be performed by and/or under the control of the processor 40, operating under control of a program stored in the memory 46.

Figure 7:
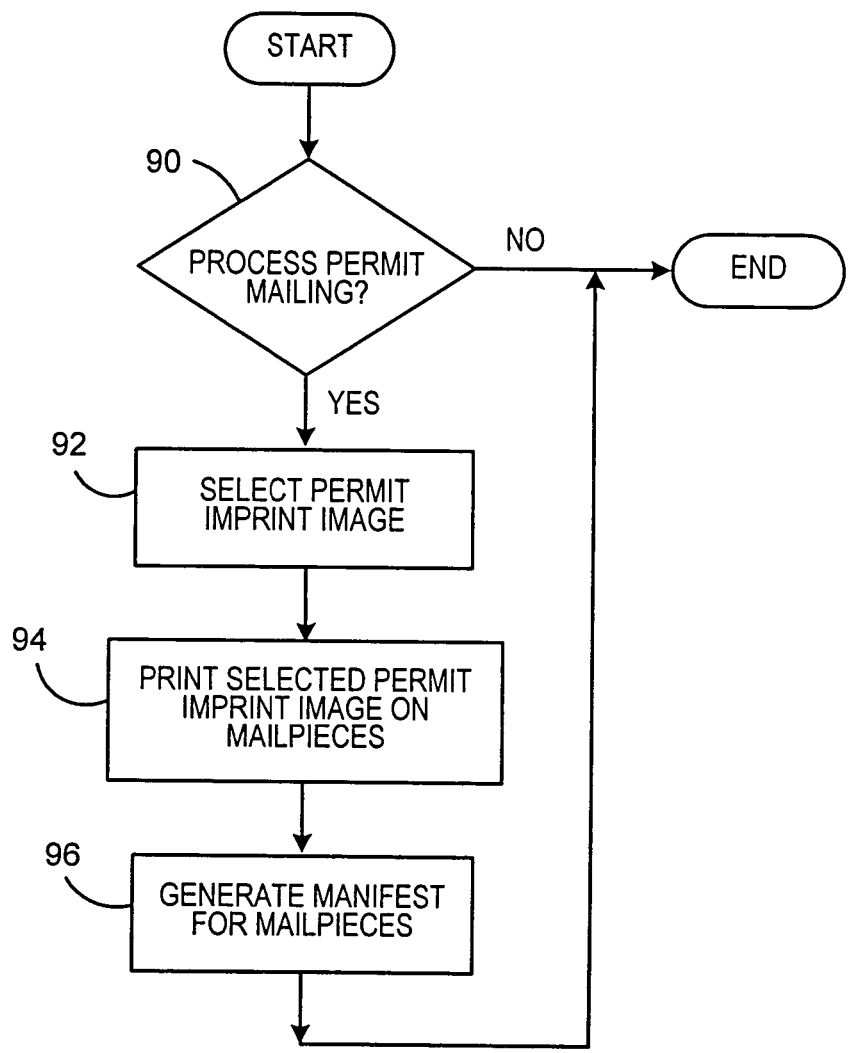
FIG. 7 is a flow chart that illustrates another process that may be performed in some embodiments of the mailing machine for producing a permit mailing.

FIG. 7 is a flow chart that illustrates another process that may be performed in some embodiments of the mailing machine for producing a permit mailing. For the purposes of FIG. 7 it is assumed that the mailing machine stores two or more permit mail imprint images. (Some or all of the images may, but need not, have been generated and stored in the mailing machine in accordance with the process of FIG. 3.) Initially, at step 90, it is determined whether a permit mailing is to be processed by the mailing machine. If so, the operator may be prompted to select one of the stored permit mail imprint images and may do so by suitable entry of operator input (step 92). Then, at step 94, a sequence of mailpieces is fed to and past the printer module 44, which prints the selected permit mail imprint image on each of the mailpieces. In addition, the mailing machine may generate a manifest for the mailpieces (step 96).

Before or after the mailpiece processing described in connection with FIG. 7, the mailing machine may be used to process another mailing using a different one of the permit mail imprint images that have been stored in the mailing machine. In connection with the other mailing, it will be understood that the other permit mail imprint is selected. Also, if the mailing machine is such as to have postage metering capabilities, the mailing machine may be used to print meter stamps on one or more mailpieces before or after the mailpiece processing described in connection with FIG. 6 or 7.

According to aspects of the invention as described herein, the process for configuring a mailing machine to print a permit mail imprint may be significantly streamlined. Since the operator can enter the required information into the mailing machine by using the user interface, and the mailing machine thereupon creates the permit mail imprint, it is no longer necessary for the owner/lessor of the mailing machine to contact the machine manufacturer, provide the permit information to the manufacturer, and wait for the manufacturer to send back the imprint image to the owner/lessor (or to the mailing machine). Thus the process of obtaining and beginning to use a mailing permit may be more convenient and less time-consuming.

Moreover, some embodiments of the invention provide for more versatile operation of the mailing machine, since it can be used to print more than one type of permit imprint and/or to print both meter stamps and permit imprints.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

A number of embodiments of the present invention have been described. Nevertheless, it will be understood that various modifications may be made without departing from the spirit and scope of the invention. Accordingly, other embodiments are within the scope of the following claims.

What is claimed is:

1. A mailing machine comprising:
a transport mechanism to transport mailpieces through the mailing machine;
a printing device to print information on the mailpieces;
a processing device coupled to the transport mechanism and the printing device, the processing device programmed to control the transport mechanism and the printing device;
a memory device coupled to the processing device to store first image data which represents a first permit mail imprint image; and second image data which represents a second permit mail imprint image, the second permit mail imprint image being different from the first permit mail imprint image;

wherein the processing device is programmed to selectively control the printing device to print the first permit mail imprint image on a first group of mailpieces and to print the second permit mail imprint image on a second group of mailpieces as the first group and second group of mailpieces are transported through the mailing machine by the transport mechanism.

2. The mailing machine according to claim 1, wherein the processing device is further programmed to:

generate a first manifest that represents the first group of mailpieces; and generate a second manifest that represents the second group of mailpieces.

3. The mailing machine according to claim 2, wherein the first and second manifests each include at least one of a class of mail, a postage value, a discount level, a total number of pieces, a date/time of processing, and customized discount codes.

4. The mailing machine according to claim 1, wherein the first permit mail imprint image includes a first postal code that is different from a second postal code included in the second permit mail imprint image.

5. The mailing machine according to claim 1, wherein the first permit mail imprint image indicates a mail class that is different from a mail class indicated by the second permit mail imprint image.

6. The mailing machine according to claim 1, wherein the first permit mail imprint image indicates a first city that is different from a second city indicated by the second permit mail imprint image.

7. The mailing machine according to claim 1, wherein the first permit mail imprint image includes a first permit number that is different from a second permit number that is included in the second permit mail imprint image.

8. The mailing machine according to claim 1, wherein the first permit mail imprint image includes a first company name that is different from a second company name that is included in the second permit mail imprint image.

* * * * *